United States Patent
Wallack et al.

(10) Patent No.: US 7,242,801 B1
(45) Date of Patent: Jul. 10, 2007

(54) IMAGE PREPROCESSING FOR PROBE MARK INSPECTION

(75) Inventors: Aaron Wallack, Natick, MA (US); Juha Koljonen, Needham, MA (US); David Michael, Wayland, MA (US)

(73) Assignee: Cognex Technology and Investment Corporation, Mt. View, CA (US)

( * ) Notice: Subject to any disclaimer, the term of this patent is extended or adjusted under 35 U.S.C. 154(b) by 652 days.

(21) Appl. No.: 10/443,580

(22) Filed: May 22, 2003

Related U.S. Application Data

(60) Provisional application No. 60/382,896, filed on May 22, 2002.

(51) Int. Cl.
*G06K 9/34* (2006.01)
(52) U.S. Cl. ...................................... 382/173
(58) Field of Classification Search ................ 382/141, 382/145–149, 260; 257/E21.53; 348/86–87, 348/125–126; 438/16
See application file for complete search history.

(56) References Cited

U.S. PATENT DOCUMENTS

| | | | |
|---|---|---|---|
| 6,208,375 B1 * | 3/2001 | Kay et al. | 348/95 |
| 6,324,298 B1 * | 11/2001 | O'Dell et al. | 382/149 |
| 6,937,753 B1 * | 8/2005 | O'Dell et al. | 382/141 |
| 6,987,875 B1 * | 1/2006 | Wallack | 382/146 |

OTHER PUBLICATIONS

Ahmed et al., "INSPAD : A System for Automatic Bond Pad Inspection", IEEE Transactions on Semiconductors Manufacturing, vol. 3, No. 3, Aug. 1990, pp. 145-147.*

* cited by examiner

*Primary Examiner*—Jose L. Couso
(74) *Attorney, Agent, or Firm*—Russ Weinzimmer

(57) ABSTRACT

Digital image processing methods are applied to an image of a semiconductor interconnection pad to preprocess the image prior to an inspection or registration. An image of a semiconductor pads exhibiting spatial patterns from structure, texture or features are filtered without affecting features in the image not associated with structure or texture. The filtered image is inspected in a probe mark inspection operation.

16 Claims, 7 Drawing Sheets

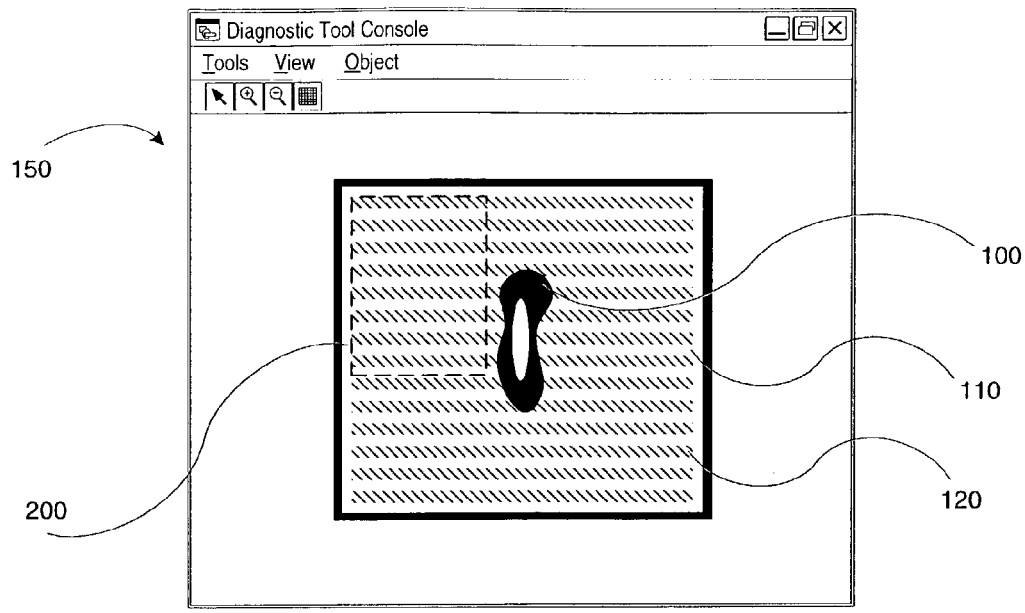
Figure 2
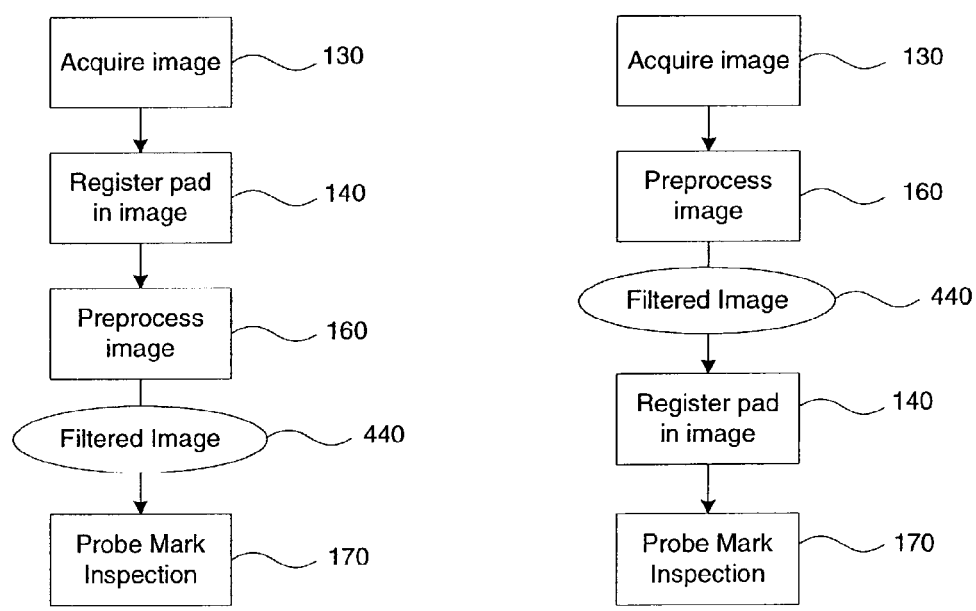
Figure 3a
Figure 3b

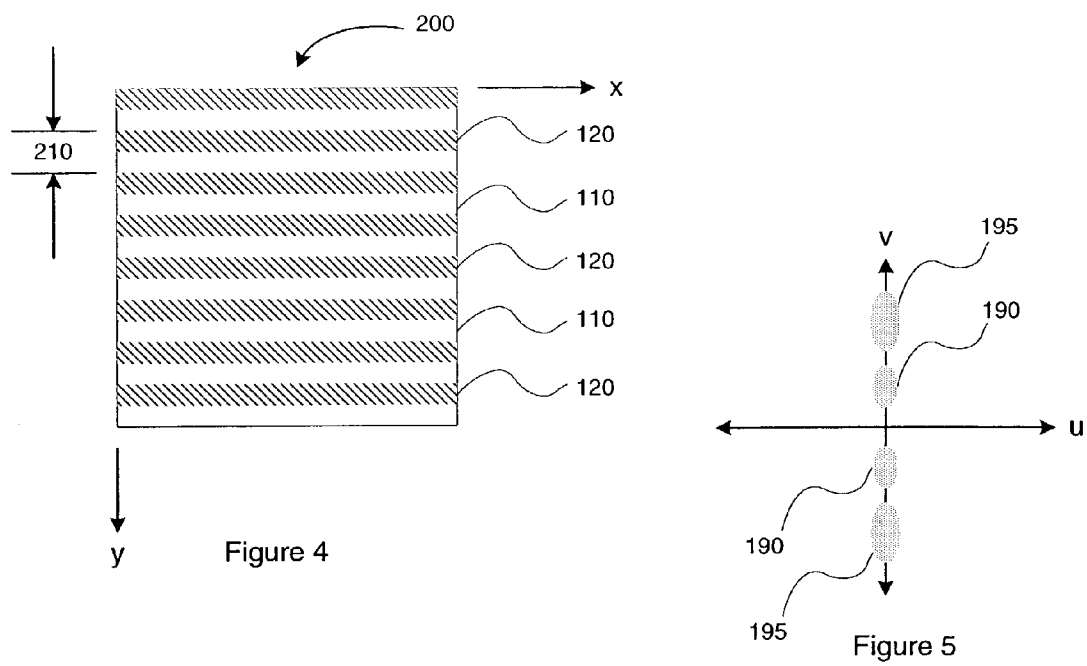
Figure 4
Figure 5
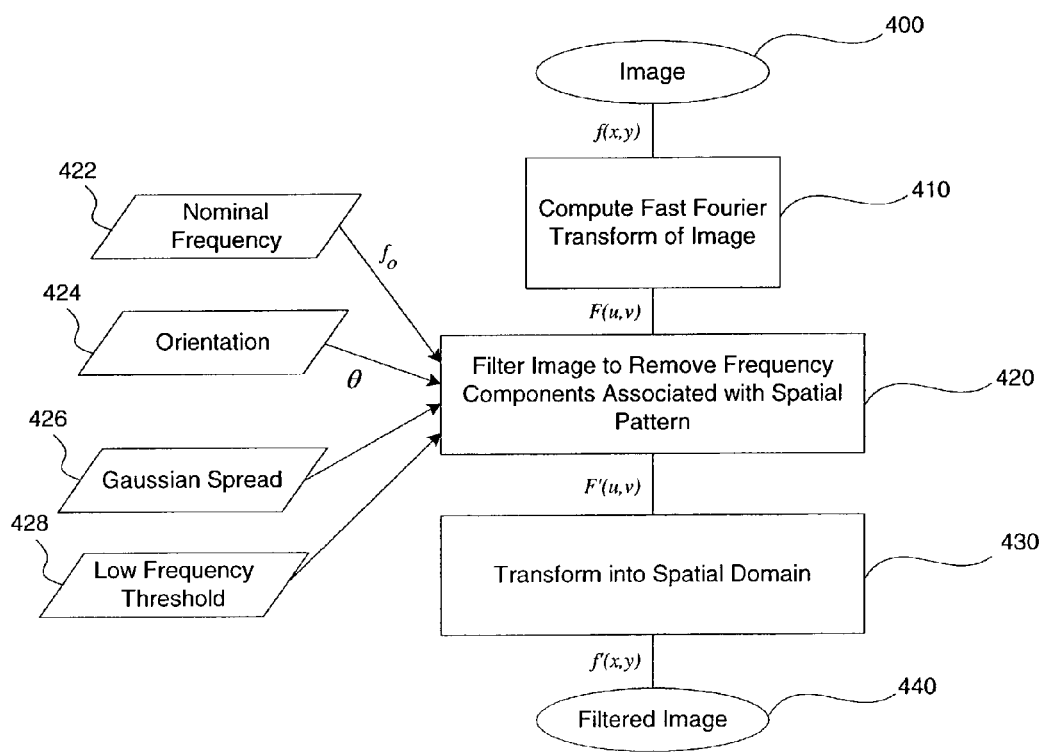
Figure 6

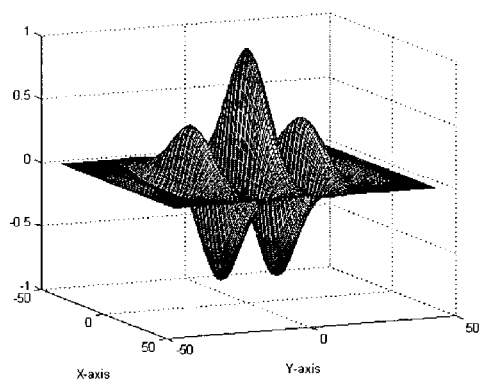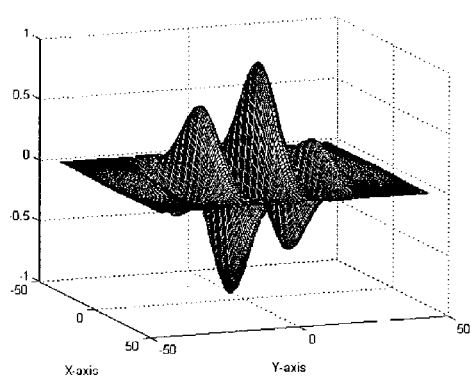
Figure 7
Figure 8
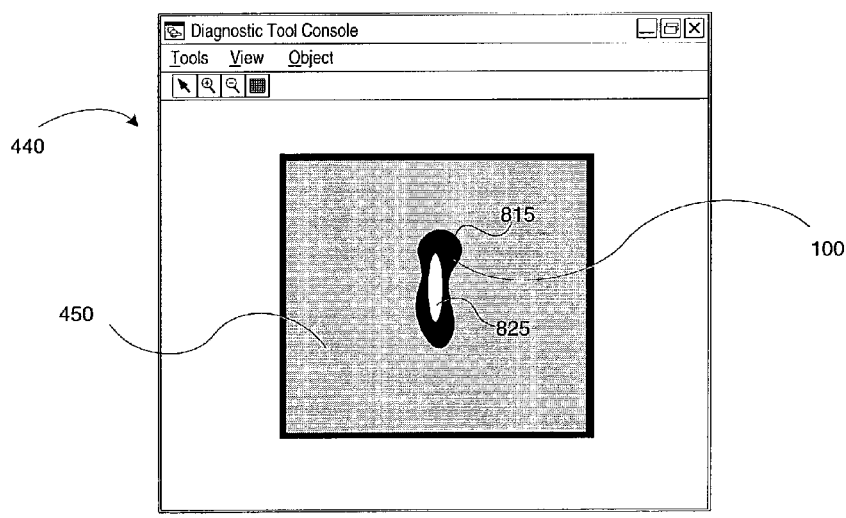
Figure 9

IMAGE PREPROCESSING FOR PROBE MARK INSPECTION

CROSS-REFERENCE TO RELATED APPLICATIONS

This application claims the benefit of U.S. Provisional Patent Application No. 60/382,896, filed May 22, 2002, entitled "Image Processing for Probe Mark Inspection."

BACKGROUND OF THE INVENTION

The present invention relates to the application of machine vision algorithms in the manufacture of semiconductor devices. Specifically, the invention applies to the inspection of interconnection lands, or pads, of integrated circuits during fabrication, to ascertain that mechanical probe marks exist, indicating that an electrical test has been performed. The use of an inspection apparatus that can automatically detect and analyze probe marks on device lands can be more reliable and accurate than manual inspection with the human eye.

Silicon device fabrication involves various circuit definition steps with chemical processing of a wafer containing an array of multiple devices. An electrical test of the wafer is typically employed to identify defective devices and/or to perform process control. This electrical test requires that an unbroken electrical connection be made from an electrical tester to the device being tested. The electrical connection is accomplished by probing the wafer with needle-tipped, electrically conductive probes, leaving an indentation or surface finish aberration on the pad where the probe made contact with the pad. An inspection of the mark left by the electrical testing probe may be performed subsequent to the electrical test to visually assess the electrical testing operations. Absence of a mark, or misalignment of the mark on the pad, would indicate that the test was not properly performed. Probe marks that are too large, or near the pad border can damage the integrity of the pad. Additionally, data collected from a probe mark inspection may be useful in process characterization and process control of equipment alignment parameters.

Probe mark inspection is a useful operation in silicon device fabrication because of the increasing size, density, and value of the silicon wafers. Good devices must not be falsely identified as defective, whereas defective devices must be accurately identified so that needless processing and packaging effort is not further expended. Verification of the integrity of the electrical testing operation ensures that the devices are properly tested to avoid the cost penalties of false or improper indictment. Human visual inspection using a microscope is extremely tedious. Thus, the operation is ideally suited for a computer-assisted machine vision application.

Inspection of probe marks on device pads with a machine vision system is difficult because probe marks are relatively unstructured in appearance. A mark indicating acceptable evidence of a probe mark may present many different appearances in an image. Additionally, the pad image may contain features from surface imperfections of the pad that may confuse or obscure the interpretation or presence of a probe mark. Furthermore, particulate deposition on the device pads from the environment may appear similar to the image of a probe mark.

Further still, the surface of the interconnection pad may be conditioned to exhibit texture or features that further complicates the inspection of probe marks. A textured surface, desired to improve the interconnection bond strength of assembled package, appears to have regular structure features in a typical grayscale image of the pad, as depicted in FIG. 2. The application of prior art methods of probe mark inspection using machine vision will often yield erroneous results since the texture features are misinterpreted to be probe mark features.

For the foregoing reasons, there is a need for a machine vision apparatus that can inspect textured silicon device pads on a wafer, and quickly and reliably assess the presence of a probe mark.

BRIEF SUMMARY OF THE INVENTION

The present invention is directed to a method and apparatus that satisfies the need for inspecting textured silicon device pads on a wafer. Additionally, the method and apparatus of the present invention facilitates an effective probe mark inspection of such textured pads.

In an embodiment of the invention, an analysis is performed on an interconnection pad of an electronic device, such as a device on a silicon wafer, where the image of the pad exhibits features of a probe mark having at least one dimensional characteristic, and at least one feature not associated with the probe mark. The feature not associated with the probe mark can be, for example, striped patterns resulting from structure or texture on the surface of the pad. An image of the pad is acquired, and filtered with an image processing filter to provide a filtered image of the pad. The pad, once filtered, can be registered, or inspected in a probe mark inspection.

In this embodiment, the image processing filter is applied by convolving a set of oriented spatial band reject filters with the image of the pad. The oriented spatial filter effectively removes the patterns resulting from structure or texture on the surface of the pad, while preserving the features having at least one dimensional characteristic in the image, such as those associated with a probe mark.

In another embodiment of the invention the parameters of the spatial band-reject filter can be automatically derived through an analysis of the image. In this embodiment, an image is acquired of an interconnection pad of an electronic device, where the image exhibits an oriented structured pattern, such as a horizontally striped pattern resulting from texture on the surface of the pad. The frequency parameter for the spatial band-reject filter can be set to the frequency having a peak magnitude in the image transformed into a frequency domain.

In this embodiment of the invention, the parameters of the spatial band-reject filter can be refined through providing, for example, a comparison frequency as a frequency parameter, and comparing the output of the two filters. The parameters of the spatial band-reject filter can then be set in response to the comparison.

In yet another embodiment of the invention, an apparatus is provided to perform a probe mark inspection on a digitally filtered representation of the pad. In this embodiment, a camera configured to acquire image data corresponding to a semiconductor pad of an electronic device is provided. A machine vision system coupled to the camera is configured to convert image data acquired by the camera into a digitally filtered representation of the pad by applying an image processing filter on the acquired image data.

BRIEF DESCRIPTION OF THE SEVERAL VIEWS OF THE DRAWING

The invention will be more fully understood from the following detailed description, in conjunction with the accompanying figures, wherein:

FIG. 2 depicts an image of a silicon device interconnection pad exhibiting a striped regular pattern and a probe mark for inspection.

FIG. 3a is a flowchart depicting the basic operation of the present invention in a probe mark inspection.

FIG. 3b is a flowchart depicting the basic operation of the present invention in an optional configuration in a probe mark inspection.

FIG. 4 is a magnified view of a region of the image of the pad from FIG. 2 depicting the striped pattern in the image of the pad.

FIG. 5 is a frequency representation of the striped regular pattern.

FIG. 6 is a flowchart depicting a method of the present invention.

FIG. 7 is a graphical representation of the real portion of the spatial domain Gabor filter of the present invention.

FIG. 8 is a graphical representation of the imaginary portion of the spatial domain Gabor filter of the present invention.

FIG. 9 depicts an image of a silicon device interconnection pad with no spatial pattern visible within the image.

DETAILED DESCRIPTION OF THE INVENTION

Figure 1:
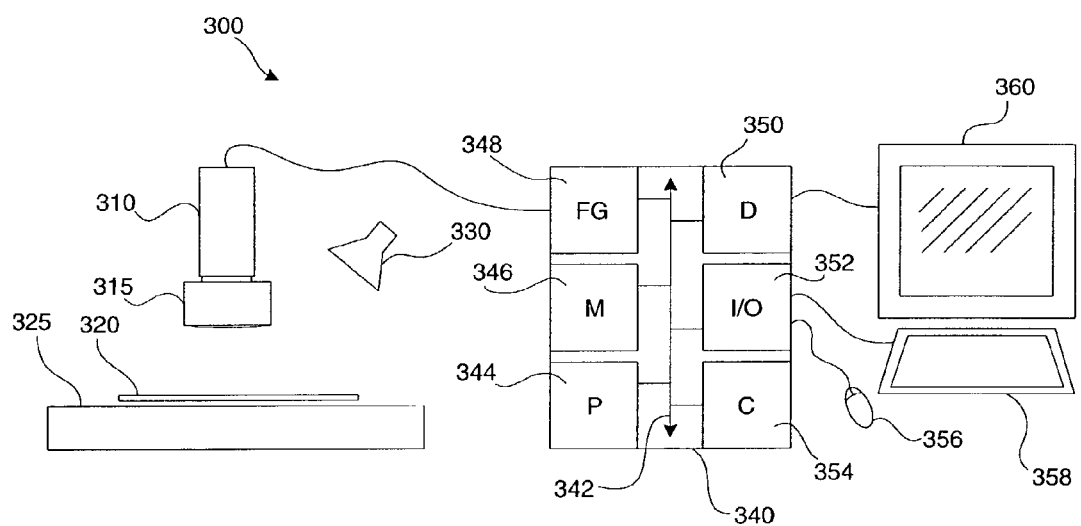
FIG. 1 is a diagram depicting the apparatus of the present invention.

Probe mark inspection is typically performed during silicon device fabrication to inspect for, and report characteristics of, the marks made on the surface of the silicon device interconnection pads by an electrical testing operation. The inspection can be performed using, for example, a machine vision inspection apparatus such as that commonly used in semiconductor device manufacturing, as depicted in FIG. 1. Referring to FIG. 1, the inspection apparatus 300 may include an image acquisition system comprising a camera 310 having a lens 315 cooperative to provide an image of the surface of a semiconductor wafer 320. The wafer 320 can be mounted on a translation table 325 to permit adjustment of the position of the wafer 320 relative to the camera 310. An illumination device 330 can be provided to sufficiently illuminate the surface of the wafer 320 for providing a quality image of the wafer 320.

The inspection apparatus 300 may include a machine vision system comprising a processor 344, a memory 346, a controller 354, a frame grabber 348, a display controller 350, an input/output (I/O) 352, and a communication data control bus 342 that couples elements 344–354 together and allows for cooperation and communication between those elements.

The camera 310 can be coupled to the frame grabber 348 for image acquisition by transferring images from the camera 310 to the general purpose computer 340 and the memory 346 therein.

The memory 346 may be preferably implemented with a sufficient quantity of random access memory (RAM), e.g., 128 megabytes, and hard disk storage, e.g., 10 gigabytes. A user can monitor the inspection apparatus 300 through the display controller 350, which can be coupled to a graphical display 360, and interact with the inspection apparatus 300 through the I/O 352, which can be coupled to a pointer device 356 and a keyboard 358.

The processor 344 works in cooperation with the controller 354 to control operation of the other elements 346–352. In cooperation with the controller 354, the processor 344 may fetch instructions from the memory 346 and decode them, which may cause the processor 344 to transfer data to or from memory 346 or work in combination with the frame grabber 348 and the display controller 350 to provide inspection information to the user via, for example, the display 360.

The controller 354 operates to control operation of the other elements 346–352 of the system 300. It should be appreciated that the controller 354 may be implemented with the processor 344, for example, in a central processing unit, or other similar device.

The inspection apparatus 300 can be implemented, for example, as portions of a suitably programmed general-purpose computer 340. The inspection apparatus 300 may alternatively be implemented, for example, as physically distinct hardware circuits within an ASIC device. The particular form of the inspection apparatus 300 can be different. For example, although the inspection apparatus 300 has been described to include a general-purpose computer 340, for example, a personal computer, it is foreseeable that the inspection apparatus 300 may include a special purpose embedded processor.

Referring to FIG. 2, an image of a silicon device interconnection pad 150 depicts the presence of a probe mark 100 that can be inspected using the inspection apparatus 300. A textured surface of the interconnection pad results in a structured pattern having dark structural regions 120 and light structured regions 110 in the image of the pad 150; the dark regions 120 and light regions 110 are features in the image 150 that are not created with, or associated to, the probe mark 100.

Conventional probe mark inspection methods, for example, as described in co-pending U.S. patent application Ser. No. 10/032,168, incorporated by reference herein, are likely to treat the dark regions 120 as probe mark features, thereby reporting erroneous results. FIG. 3a and FIG. 3b depict alternate embodiments of present invention as an application of a pre-processing step to effectively remove the structured pattern in the image without affecting the features that are associated with the probe mark 100. In FIG. 3a, an image of a semiconductor pad 150 is acquired at step 130 in a run-time inspection operation.

One skilled in the art will appreciate that probe mark inspection may involve registration of the pad, i.e., determining the precise location of a model of the pad in the image of the pad 150, shown as step 140. Once registered, the results of the probe mark inspection can be reported with respect to the pad location. The registered image is preprocessed at step 160 to remove the structured pattern in the image to provide a filtered image 440. The filtered image 440 can then be inspected at step 170 using conventional probe mark inspection methods and techniques to inspect the image of the pad 150 to find and measure the characteristics of the probe mark 100.

FIG. 3b depicts an alternate embodiment of the present invention where the registration step 140 is applied after the preprocessing step 160. This alternate embodiment may be necessary if the structured pattern in the image of the pad 150 interferes with the registration step 140.

There are many ways to preprocess an image of a pad 150 to provide a filtered image 440, however, the desired effect of the present invention is to remove expected features of the pad while not affecting the characteristics of the probe mark 100. The method of the present invention in the exemplary embodiment is described with respect to the pre-processing of an image of a pad 150 having texture such that a striped pattern is present. While the present invention will hereinafter be described in connection with an exemplary embodiment thereof, it should be understood that it is not intended to limit the invention to that embodiment. On the contrary, it is intended to cover all alternatives, modifications and equivalents as may be included within the spirit and scope of the invention as defined by the appended claims.

A repetitive spatial pattern can be associated with a fixed set of frequencies, therefore, the problem of removing structural pattern in an image of the pad 150 can be more easily visualized by working in the frequency domain. Fourier Transforms and Discrete Fourier Transforms are well known in the art when dealing with one-dimensional or two-dimensional data in terms of frequency components. The following is the equation of the Discrete Fourier Transform, F(u,v) of an image f(x,y) where (u,v) refers to the spatial frequency components of the image (note that F(u,v) is a two-valued (complex) function even though the image f(x,y) values are all real):

$$F(u, v) = \frac{1}{N \cdot M} \sum_{x=0}^{N-1} \sum_{y=0}^{M-1} f(x, y) e^{-2\pi \cdot i((x \cdot u/N) + (y \cdot v/M))} \quad \text{Eqn. 1}$$

$$f(x, y) = \sum_{u=0}^{N-1} \sum_{v=0}^{M-1} F(u, v) e^{2\pi \cdot i((x \cdot u/N) + (y \cdot v/M))} \quad \text{Eqn. 2}$$

The Nyquist Theorem results in limitations of frequency components that can be represented in an image. Since a pixel represents a sample of a spatial pattern having a frequency, the sampling rate under Nyquist must be twice that of the signal frequency to be measurable. Therefore the highest spatial frequency component that can be measured would have a period of no less than 2 pixels, or a frequency of 0.5 cycles/pixel.

FIG. 4 is a depiction of a region 200 of the image of the pad 150, showing a regular horizontal pattern in the image composed of light regions 110 and dark regions 120, in image space (x,y). The regular horizontal pattern is a spatial pattern having a period 210. FIG. 5 is a frequency representation of the region 200, as a function of frequency components (u,v). The frequency based representation of the image region 200 of FIG. 5 shows symmetric frequency components corresponding to a first harmonic of pattern frequency 190 and a second harmonic of pattern frequency 195. The components of the frequency image of FIG. 5 are highly localized, as they appear as peaks in the frequency domain representation or Fourier transform of the image of the pad 150. Consequently, it is possible to remove the textured pattern in the frequency-based representation by filtering out the symmetric frequency components (i.e., the first harmonic of pattern frequency 190 and the second harmonic of pattern frequency 195).

An image of the pad 150 having a striped pattern, when transformed into frequency space, as shown in FIG. 5, will have a two dimensional frequency component having a particular orientation and period. The orientation of the frequency component is the angle at which the peaks appear with respect to the x-axis of the frequency domain, and the frequency of the frequency component is the distance from the origin or center of the frequency domain.

The method of preprocessing the image of the pad 150 of the present invention removes two dimensional frequency components of the striped regular pattern. Removal of the two dimensional frequency components of the striped regular pattern can be performed through the application of a filter, or a sequence of filters, to cut out the frequency components corresponding to the striped regular pattern. For example, as shown in FIG. 5, the striped regular pattern exhibits two harmonics: the first harmonic of pattern frequency 190; and the second harmonic of pattern frequency 195. One skilled in the art will appreciate that additional harmonic frequencies associated with the regular striped pattern may exist, e.g., third harmonic, fourth harmonic, etc., if the texture period is substantially more than two pixels. A Finite Impulse Response (FIR) filter is typically applied by convolving a filter kernel with the image to remove two dimensional frequency components.

An effective filter for the removal of striped regular patterns from an image is a type of Gabor filter, having an oriented two dimensional spatial band pass filter. A Gabor filter is a complex filter described as a sine wave in one direction modulated by a Gaussian in the spatial domain. This filter has the interesting property that it transforms to a Gaussian in the frequency domain. This Gaussian is an oriented band pass filter with the center pass frequency determined by the frequency of the sine wave, the orientation determined by the orientation of the sine wave and the band pass range determined by the sigma, or spread, of the Gaussian envelope.

A Gabor filter is the product of asymmetric Normal Gaussian Distribution decay and sinusoidal undulations at a particular frequency and in a particular direction. A Gabor filter, having Gaussian spread 426, denoted $\sigma_x, \sigma_y$, nominal frequency 422, denoted $f_o$ and orientation 424, denoted $\theta$, is a complex function. The following formula defines the filter kernel in the spatial domain where g(x,y) is a bivalued filter (i.e., with components that are both real and imaginary):

$$g(x, y) = \exp\left(-\frac{1}{2}\left(\frac{x^2}{\sigma_x^2} + \frac{y^2}{\sigma_y^2}\right)\right) \exp(i2\pi f_o(x\cos(\theta) + y\sin(\theta))) \quad \text{Eqn. 3}$$

The result of filtering an image f(x,y) with the above Gabor filter in the spatial domain is the image:

$$f'(x_0, y_0) = \left| \sum_{y=-L_y}^{y=L_y} \sum_{x=-L_x}^{x=L_x} f(x, y)g(x - x_0, y - y_0) \right| \quad \text{Eqn. 4}$$

Here $L_x$, $L_y$ are half-lengths of the filter in x and y directions respectively.

The Gabor filter described above is graphically represented in FIG. 7, which depicts a plot of the real portion of the spatial domain Gabor filter, and in FIG. 8 which depicts the imaginary part of the spatial domain Gabor filter. The Fourier transform of the Gabor filter described above is a two dimensional Gaussian in the frequency domain centered at the two dimensional frequency ($f_0 \cos(\theta)$, $f_0 \sin(\theta)$) with the following formula:

$$g(x, y) = \exp\left(-\frac{1}{2}\left(\left(\frac{x - x_a}{\sigma}\right)^2 + \left(\frac{y - y_a}{\sigma}\right)^2\right)\right) \quad \text{Eqn. 5}$$

where $x_a = f \cos(\theta)$, $y_a = f \sin(\theta)$. The filtering operation is a multiplication of the Fourier transform of the Gabor filter with the Fourier transform of the image, which one skilled in the art would understand to be equivalent to a convolution of the spatial domain filter on the image.

While equations 3, 4, and 5 above describe a Gabor filter, the type of Gabor filter that is particularly well adapted to remove striped patterns in an image of a pad 150 is a Gabor band reject. The Gabor band reject filter corresponds to 1-Gabor, i.e., a Gabor band reject filter rejects all bands passed by the Gabor band pass filter, while accepting everything that a Gabor band pass filter rejects.

In a typical filtering operation, the filter kernel is constructed in the spatial domain and convolved with the image. When filtering in the frequency domain, however, the filter is typically transformed and then multiplied with the image transform. Gabor filters are simple to construct directly in the frequency domain, thus facilitating its application directly in the frequency domain. A Gabor function appears as a Gaussian function with the peak at the center frequency. The Gabor band reject appears as 1-Gabor with a small value at the center frequency, assuming the filter is a normalized multiplicative filter so that "1" results in no effect on the corresponding frequency component and "0" results in an elimination of the corresponding frequency component. Applied to the image of the pad 150, the striped patterns is effectively eliminated without significantly affecting non-striped pattern features in the image of the pad 150.

Referring to FIG. 6, a method of removing striped regular patterns from an image of the pad 150 is shown. An image 400 is provided, denoted as f(x,y) in the spatial domain, which can be the actual image of a pad 150, or just that portion of the image that has been registered by locating a model of the pad in the image. A Fast Fourier Transform (FFT) of the image 400 is computed 410 to provide a transformed image, denoted as F(u,v) in the frequency domain.

Frequency components are removed 420 by applying one or more Gabor band reject filters on the transformed image 410 to create a filtered image, denoted as F'(u,v) in the frequency domain. Alternatively, all of the one or more Gabor band reject filters can be combined into a single composite filter so that only one filter need be applied. Filter variables include the nominal frequency 422, denoted as $f_o$ (which is equivalent to the inverse of the spatial period 210 of the spatial pattern), orientation 424, denoted as θ, such as 90° for a horizontally striped spatial pattern, Gaussian spread 426, and a low frequency threshold 428. The low frequency threshold 428 is used to preserve the direct current (DC) element, since the Gabor band reject filter may bleed into F(0,0), reducing the value at F(0,0), and thereby reducing the average grey level. The exemplary embodiment of the present invention has shown that a Low Frequency Variable set to 1 (resulting in the Gabor band reject filter having no effect at F(0,0)—i.e., the value at F(0,0) is unchanged after applying the Gabor band reject filter), and a Gaussian spread 426 value described as height=0.352*frequency*harmonic, width=0.059, can be effective for most spatial patterns that appear on interconnection pads.

The filtered image F'(u,v) in the frequency domain is then transformed back into spatial domain 430 by taking the composite magnitude of the real and imaginary components f_re(x,y), f_im(x,y) corresponding to the Inverse fast Fourier Transform of F'(u,v) to provide a filtered image 440, denoted as f'(x,y).

To protect low frequency components of the image, the values of the Gabor band reject filter can be forced to "1" for frequencies close to zero. The threshold for protecting low frequency components is the Low Frequency Variable 428 set by the user.

In a typical image of the pad 150, if the spatial period 210 of the regular striped pattern has a spatial period larger than four pixel elements, then the pattern will usually contain a second harmonic of frequency that is twice the original frequency. There may be more harmonics if the spatial period 210 of the spatial pattern is even higher. For example, a horizontally striped pad having a spatial period of five pixel elements will involve four Gabor band reject filters to remove the frequency components at: (1/5, π/2); (2/5, π/2); (1/5, 3π/2), and (2/5, 3π/2). Note that frequency components greater than 0.5 cycles/pixel in the image are undetectable in view of the Nyquist theorem.

Referring again to FIG. 6, the step of filtering the image to remove frequency components associated with the spatial pattern 420, it is necessary to decimate the harmonics as well as the nominal frequencies. A Gabor band reject filter for each harmonic frequency may need to be used. The size of each Gabor band reject filter should be related to the frequency being decimated, i.e., the size of the Gabor band reject filter for the second harmonic should be twice as large (in frequency units) as the size of the Gabor band reject filter for the nominal frequency.

The filtered image in frequency domain, denoted as F'(u,v) in FIG. 6 can be transformed back into spatial domain using an Inverse Fast Fourier Transform 430, to provide a filtered image 440, denoted as f'(x,y). In the exemplary embodiment, the filtered image 440 is derived from the magnitude of the real and imaginary components of the inverse FFT images:

f'(x, y)=$\sqrt{Re(x,y)^2 + Im(x,y)^2}$ where

Re(x, y)=ΣΣi(x, y)*gabor_reject Re(x−$x_0$,y−$y_0$)

Im(x, y)=ΣΣi(x, y)*gabor_reject Im(x−$x_0$,y−$y_0$) and gabor_reject Re(x, y)=deltaFunction(x, y)−gabor Re(x, y)

gabor_reject Im(x, y)=gabor Im(x, y) and deltaFunction(x,y)={1 if (x==0, y==0), otherwise 0}. In the frequency domain:

gabor_rejectRe(u,v)=1−gabor Re(u,v) and gabor_rejectIm(u,v)=1−gabor Im(u,v).

Since convolution of the band-reject filter is applied to the transformation of the image 400 in the frequency domain at step 420, multiplication of the Gabor band reject filter in the frequency domain corresponds to convolution in the spatial domain. The exemplary embodiment has been implemented steps 410, 420, and 430 as follows:

Re(u,v)=I(u,v)*GABORREJECTRe(u,v)

Im(u,v)=I(u,v)*GABORREJECTIm(u,v) and

Re(x,y)=InverseFFT(Re(u,v))

Im(x y)=InverseFFT(Im(u,v)).

Thus, pseudo-code for the complete sequence in the exemplary embodiment is: during training:

for (I=0; I<numHarmonics; ++I)
   GABORREJECTRe_$_I$(u,v)=FFT(gabor_rejectRe_i(x,y)
   GABORREJECTIm_$_I$(u,v)=FFT(gabor_rejectIm_i(x,y)

at runtime:

I(u,v)=FFT(I(x,y))

where Re(u,v) is the real part of I(u,v), and Im(u,v) is the imaginary part of I(u,v);

for (I=0; I<numHarmonics; ++I)
   Re(u,v)=Re(u,v)*GABORREJECTRe_I(u,v)
   Im(u,v)=Im(u,v)*GABORREJECTIm_I(u,v)

Re(x, y)=InverseFFT(Re(u,v))

Im(x,y)=InverseFFT(Im(u,v)) to produce the filtered image 440:

$f'(x, y) = \sqrt{Re(x,y)^2 + Im(x,y)^2}$

One skilled in the art will appreciate that FFTs are most efficient when the image size (in pixels) is an exact power of two (although FFTs are functional with arbitrary sized images). In the exemplary embodiment, since the area of interest is the image of the pad 150, a window can be selected having a size that is an exact power of two, with the pad centered in the window. Further, the image size is selected in view of the convolution kernel so that the mirroring effect of FFT is not introduced (FFTs display a mirroring property since the frequencies wrap around at $2\pi$—and if the convolution kernel extends past the image border, it picks up pixels from the other side). Thus, the window selected by the exemplary embodiment is an exact power of two pixels larger than max((pad.width+kernel.width), (pad.height+kernel.height)).

Further, to compensate for a slight offset in the mean greylevel values induced by the Gabor convolution kernel, the exemplary embodiment employs a fixed Gabor band reject filter that enforces a zero offset; this is accomplished by the Low Frequency Threshold 428 set to 1. For example, this is achieved by setting the frequency domain value at F(0,0) to 1. Psuedo-code for the function in the exemplary embodiment is:

for (I=0; I<numHarmonics; ++I)
   GABORREJECTRe_I(u,v)=FFT(gaborRejectRe_I(x,y))
   GABORREJECTRe_I(0,0)=1
   GABORREJECTIm_I(u,v)=FFT(gaborRejectIm_$_{I(x,y)}$)

The filtered image 440, depicted in FIG. 9, will have a uniform background 450, and the probe mark 100 remaining virtually unchanged. It is common for the probe mark 100 to exhibit dark markings 815 and bright markings 825, as shown in the filtered image 440. The filtered image 440 can then proceed with a probe mark inspection 170 as shown in FIG. 3a and FIG. 3b.

While the orientation 424 and nominal frequency 422 of the spatial pattern on the image of the pad 150 can be set as an input variable by the user, the values can be automatically extracted from the image of the pad 150. These values can be extracted at training time, or the extraction can be performed for each pad during run time. The nominal frequency 422 can be extracted if the orientation of the spatial pattern is known, or through an iterative process using orientation estimates, the spatial period and orientation of the spatial pattern can be derived. Alternatively, the user can provide an approximate spatial frequency that can be refined using the extraction methods described herein.

Figure 10:
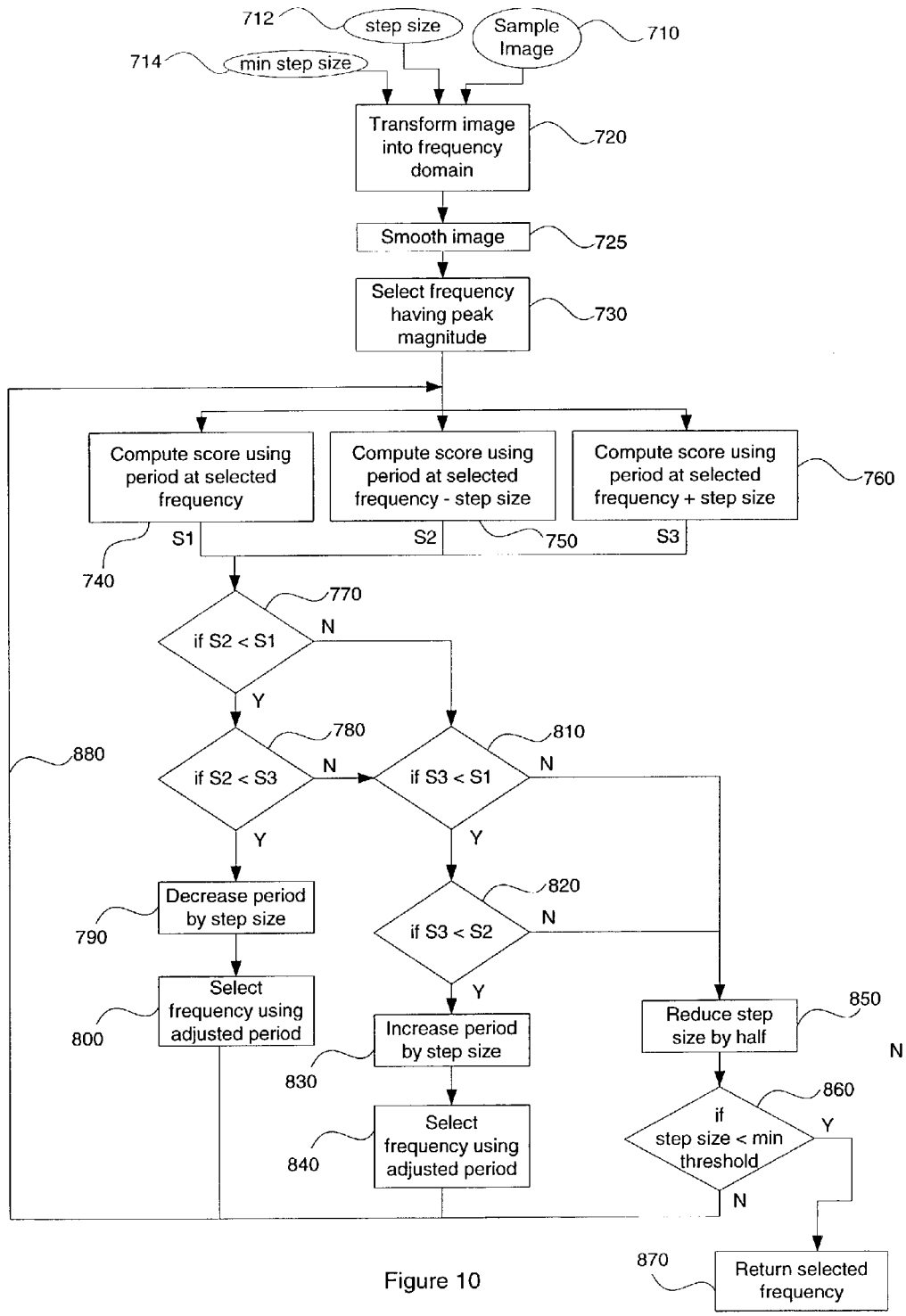
FIG. 10 is a flowchart depicting the method of extracting the spatial pattern frequency from the image according to the present invention.
Figure 13:
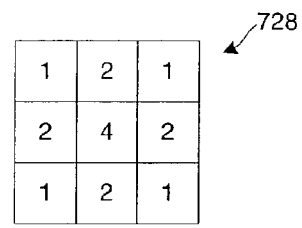
FIG. 13 depicts a representation of a 3×3 spatial filter employed by an embodiment of the present invention.

FIG. 10 describes the steps to automatically detect and extract the period 210 of the spatial pattern, using a hill-climbing refinement method. A sample image 710 is provided representative of the image of the pad 150. Other inputs include a step size variable 412, and a minimum step size variable 414, which the exemplary embodiment uses 0.01 and 0.000001 respectively. The sample image 710 is transformed into frequency domain 720 through the computation of a Fast Fourier Transform. Optionally, the frequency image can be smoothed 725 by convolving it with a spatial filter, for example, a 3×3 spatial filter 728 as shown in FIG. 13, to reduce the effect of noise and artifacts.

The frequency having a peak magnitude 730 is selected from the smoothed frequency image. The peak must be at least a certain distance from the origin (e.g., 3 pixels), and can be at most a third of the image (image.width/3 pixels) from the origin. In the exemplary embodiment, the peak magnitude 730 must be close to the expected frequency orientation, e.g., at most a max(0.2*max(image.width, image.height),3) pixels from the line through the origin at the frequency orientation. The effectiveness of the filter kernel in removing the spatial pattern from the sample image 710 is evaluated by computing a score for three frequencies related to the selected frequency. A first score S1 is computed using the period at the selected frequency 740. A second score S2 is computed using the period of the selected frequency reduced by the step size 750. A third score S3 is computed using the period of the selected frequency increased by the step size 760. The three scores S1, S2, and S3 are used to refine the peak frequency; alternatively, the peak frequency/2 (half frequency) can be examined. In the exemplary embodiment, the half frequency is selected unless 80% of the score using the refined original peak is less than the score using the refined half frequency.

Figure 11:
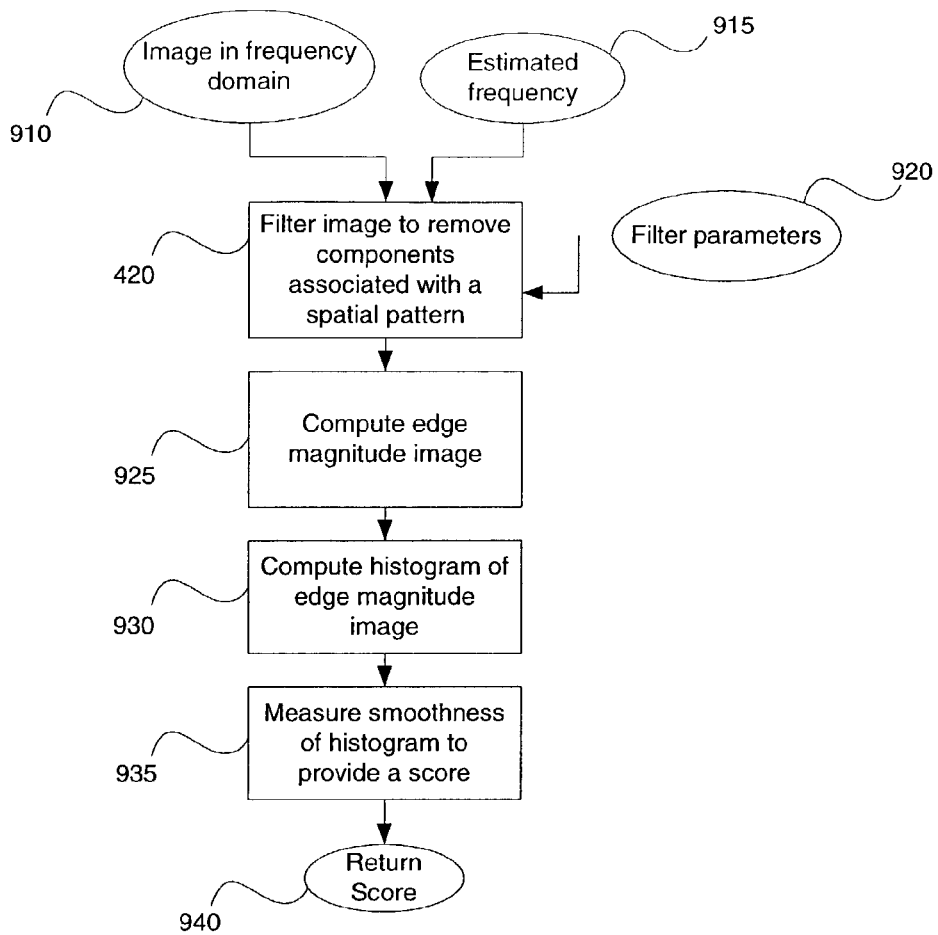
FIG. 11 is a flowchart depicting the method of evaluating the spatial pattern frequency extracted from an image according to the present invention.

The score algorithm is described in FIG. 11 to provide a method for evaluating the effectiveness of the filter kernel at removing the spatial pattern from the sample image 710. The score is applied to the image in a frequency domain 910. The estimated frequency 915 is provided, with the filter parameters 920, which may include orientation 424, Gaussian spread 426 and low frequency threshold 428.

The image in a frequency domain 910 is filtered to remove components associated with a spatial pattern 420, using the estimated frequency 915 and filter parameters 920, as described above. An edge magnitude image 925 is computed from the filtered image using methods commonly known to one skilled in the art. A Sobel edge detection algorithm, for example, such as that which is a component of the Cognex Corporation CVL vision tools library, can be applied to produce an edge magnitude image of the filtered image in the frequency domain. A histogram of the edge point magnitude image 930 is computed in order to conveniently measure the amount of information in the filtered image. A measurement of the sharpness of the image as measured by the histogram of the magnitudes is used to provide a score, which is then returned as a measurement of the effectiveness of the filter using the estimated frequency 915 and the filter parameters 920 to remove the texture. An estimated frequency 915 and filter parameters 920 that result in an effective removal of the spatial pattern will correspond to an edge magnitude image 925 having few edge features. As a result, an inappropriate choice of frequency will not affect the pad texture and result in a higher score 940.

To further distinguish features associated with the probe mark 100, and other non-repetitive spatial pattern features, the measurement of image smoothness (via histogram of the magnitude) 935 can be restricted to the lower half of the histogram. Further, a convenient measurement of the histogram smoothness can be the computation of the standard deviation of the computed histogram of the magnitude image 930, or preferably, the standard deviation of the lower half of the distribution of the computed histogram 930.

Referring back to FIG. 10, score S2, the score using the frequency of the period of the selected frequency reduced by the step size, is compared to score S1, the score using the selected frequency, at step 770. If score S2 is less than score S1, score S2 is further compared with score S3, the score using the frequency of the period of the selected frequency increased by the step size, at step 780. If score S2 is less than both score S1 and score S3, the period of the selected frequency is reduced by the step size at step 790 (to effectively increase the frequency). The frequency of the adjusted period is selected at step 800, and control loops back 880 to recompute scores using the new selected frequency. If either score S1 or score S3 is not less than score S2, then score S3, the score using the frequency of the period of the selected frequency increased by the step size, is compared to score S1, the score using the selected frequency, at step 810. If score S3 is less than score S1, then S3, the score using the period at the selected frequency increased by the step size, is compared to score S2, the score using the frequency of the period of the selected frequency reduced by the step size, at step 820. If score S3 is less than score S2 at step 820, then the period of the selected frequency is increased by the step size at step 830 (to effectively decrease the frequency). The frequency of the adjusted period is selected at step 840, and control loops back 880 to recompute scores using the new selected frequency. If either score S3 is not less than score S1, or score S1 is not less than score S2, then the step size is reduced by half at step 850. If the step size after adjustment has not fallen below the minimum step size threshold 714 at step 860, then control loops back 880 to recompute scores using the original selected frequency, but now with a reduced step size. If the step size has been reduced to less than the minimum step size 714, then a conclusion can be drawn that the spatial period of the sample image has been determined to be the period of the selected frequency, and the frequency of the spatial pattern using the period of the selected frequency is returned at step 870.

Figure 12:
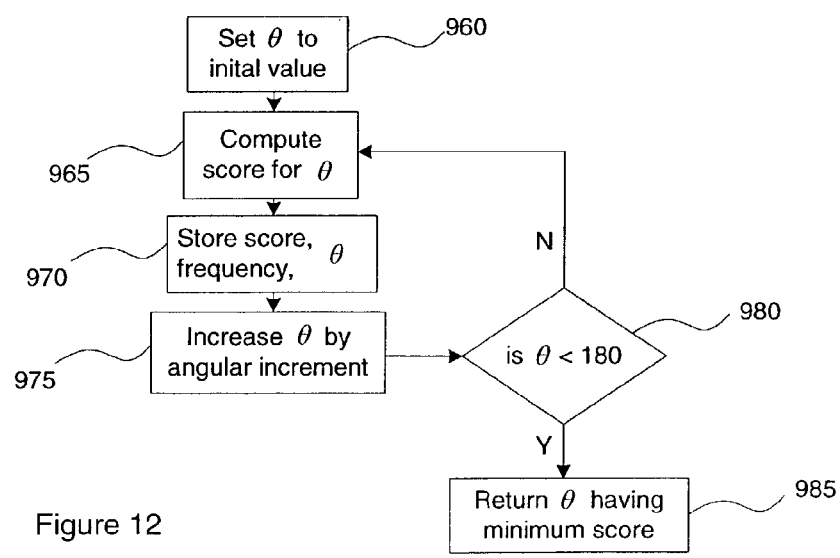
FIG. 12 is a flowchart depicting the method of iteratively deriving the orientation of the spatial pattern visible within the image.

The orientation of the spatial pattern can be iteratively derived from the sample image 710 as shown in FIG. 12. An initial value of zero degrees is set for the orientation θ at step 960. A score is computed at step 965 using the value of θ as a filter parameter 920 in deriving a selected frequency according to FIG. 10, the score being like that described at FIG. 11 under the method described at FIG. 10. An array or table of the values of orientation θ, the selected frequency 870 derived using the orientation θ, and the associated score is stored at step 965. The orientation θ is then increased by an angular increment at step 975, such as, for example, an angular increment value of two degrees. The iterative process continues at step 980, where the orientation θ is allowed to vary through 180 degrees; if the incremented value for orientation θ is less than 180 degrees, a new score is computed using the new value for orientation θ as a filter parameter 920. Once all possible angular orientations have been evaluated, the frequency and angular orientation of the spatial pattern is determined to be the selected frequency 870 and the associated angular orientation θ having the minimum score value computed at step 965. The selected frequency 870 is the derived spatial pattern frequency set to the nominal frequency 422, and the associated angular orientation θ from step 985 is set to the orientation 424 to be used as the filter parameters during run time.

Figure 14:
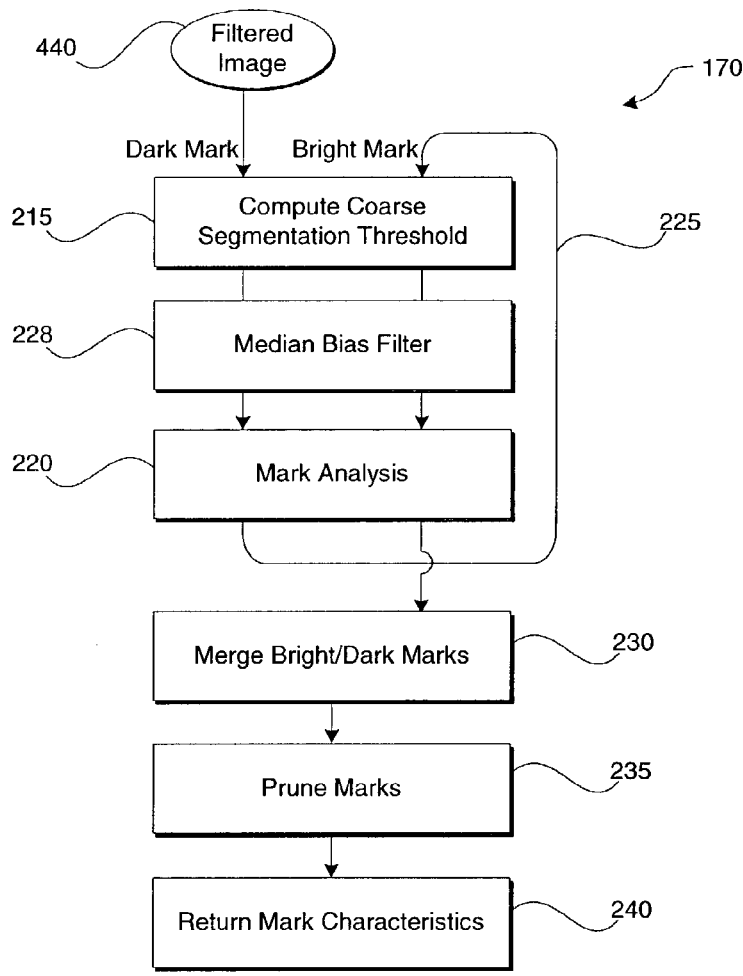
FIG. 14 is a flowchart depicting the method of inspection according to an embodiment of the present invention.

Referring again to FIG. 3a and FIG. 3b, the filtered image 440 can have a probe mark inspection 170 performed to inspect and report characteristics of a probe mark 100 in the image 150. FIG. 14 depicts a flowchart of the method used for a probe mark inspection 170 in the exemplary embodiment.

Referring to FIG. 14, the filtered image 440 can be subjected to a sequence of steps for dark marks 815, i.e., marks exhibiting a dark appearance in a light background, the sequence comprising a segmentation threshold computation at step 215, and a mark analysis at step 220. The same sequence can then be performed for bright marks 825, i.e., marks exhibiting a bright appearance relative to the background, as shown by reference 225. Alternatively, a user can optionally select bright mark analysis, or dark mark analysis, or both, as described.

The computation of a coarse segmentation threshold at step 215 is performed on the filtered image 440. The segmentation threshold is computed from a histogram analysis to differentiate between the pad surface and the probe mark. The segmentation threshold can be automatically derived using within-group variance (WGV), commonly known in the art, and described in Computer and Robot Vision, Volume I, by Robert M. Haralick and Linda G. Shapiro, Addison-Wesley (1992), pp. 20–23. Further examples of deriving segmentation thresholds using WGV are described in commonly owned U.S. patent application Ser. No. 10/389,475, entitled "Method and Apparatus for Automatic Measurement of Pad Geometry and Inspection Thereof," incorporated herein by reference. An application of WGV will produce a histogram of grey levels on the pad, and choose an optimal threshold for separating the histogram into two distributions such that it minimized the sum of the standard deviations (weighted by the number of contributors) of the two distributions. In the exemplary embodiment, the threshold is clamped to between (possibly) 6 sigma and (definitely) 12 sigma from the mean (the sigma and mean are computed from the middle 50% of the histogram). While the threshold is clamped to be at most 12 sigma, when clamped to be at least 6 sigma, a "fuzzy clamping" is used. The fuzzy clamping is based on a WGV score using the normalized Between Group Variance (BGV). The Between Group Variance is normalized to between 0 and 1 by dividing it by the variance (BGV/Variance). If the WGV score is below 0.78, then we use the "clamp" to ensure that the threshold is at least 6 sigma away (6 sigma is used when looking for marks that appear to be dark on a light background and 8 sigma when looking for marks that appear to be bright on dark backgrounds). If the WGV score is greater than 0.82, then the "clamp" is ignored, and the computed WGV threshold is used. If the WGV score is between 0.78 and 0.82 and if the threshold is outside the clamp range (so that it would be clamped), then the difference between the computed WGV threshold and the sigma-based clamp is computed and multiplied by (1−(0.82−WGV score)/(0.82−0.78)) to determine what fraction of the difference is added to the threshold.

Since the coarse segmentation threshold step 215 considers both bright and dark probe marks, a tripartite WGV can be used to determine thresholds for bright mark/background, and dark mark/background. The tripartite within-group variance minimizes the same sum as the basic within-group variance algorithm, though operated upon three distributions: bright marks, pad background, and dark marks. The thresholds can be iteratively derived by performing WGV on the upper and lower distributions of the region under analysis. For example, using the filtered image 440, a distribution of greylevel values will likely produce a median greylevel value. Application of WGV on the distribution greater than the median value will yield a threshold t1, and application of WGV on the distribution less than the median will yield a threshold t2. A tripartite WGV can then be performed on the three distributions using the thresholds t1, and t2, to derive an new pair of thresholds defining three distributions (where t1<median<t2), if the user specified an inspection for dark and/or bright marks. The tripartite WGV can be repeatedly operated until the dark/bright mark thresholds no longer changes.

The median bias filtering step 228 is performed to remove noise, and to accommodate transitional regions, such as the edge of the pad. Further examples of applying median bias filters are described in commonly owned U.S. patent application Ser. No. 10/389,475, entitled "Method and Apparatus for Automatic Measurement of Pad Geometry and Inspection Thereof," incorporated herein by reference. Transitional regions in the image typically will not have instantaneous transitions at region boundaries, and since the background greylevel is not constant, a uniform greylevel threshold cannot be accurately determined. A conservative approach can thus be applied to detect features of marks that are extremely apparent.

The greylevel values of regions can be normalized in the median bias filtering step 228 by offsetting the pixel values according to a median greylevel value derived for each pad-aligned row/column of the region. The compensation is the difference between the median grey level of that strip and the nominal grey level of the adjacent inner region. Since the pixels are on the image grid, then median pixel values at a particular pixel can be linearly interpolated from the nearby median strips. Also, if a pixel lies in the intersection of a row and a column, its median-biased grey level can be based upon either the row or column depending upon which one makes it closer to the nominal grey level. A median greylevel can be determined, and each pixel can be compensated by an offset to adjust the median greylevel to that of the background.

The use of the term "median" does not necessarily imply a 50% median; it may refer to the 75 percentile or 25 percentile of the cumulative histogram, depending upon whether the object is an analysis of "dark" marks or of "bright" marks relative to the background. The pixel values are used to compute the median grey level for each strip exclude those near known marks (i.e., marks in the adjacent inner region that touch the adjacent inner region boundary). If an insufficient number of pixels remain to accurately compute the median (e.g., less than 25% of the pixels), then the median-bias filtering step for the particular row/column may be skipped.

The coarse segmentation threshold of step 215 is then used in a blob analysis of the filtered image at mark analysis step 220. A minimum blob size threshold can be employed to filter small surface imperfections that may appear in the filtered image. Further, an edge-blob analysis can be performed at analysis step 220 using a combination of binary image (blob) analysis with greyscale edge data analysis, as disclosed in commonly owned U.S. patent application Ser. No. 09/708,431 entitled "Object and Feature Detector System and Method" and U.S. patent application Ser. No. 10/032,168, entitled "Probe Mark Inspection Method and Apparatus," both incorporated herein by reference.

Referring again to FIG. 14, once steps 215 and 220 are performed for both bright and dark marks, the results are then merged at step 230. Further examples of merging marks are described in commonly owned U.S. patent application Ser. No. 10/389,475, entitled "Method and Apparatus for Automatic Measurement of Pad Geometry and Inspection Thereof," incorporated herein by reference. Any pair of marks are merged if the pair contains regions of opposite polarity (bright/dark), and the minimum distance between those regions is within a certain threshold, for example, 8 pixels. Optionally, merging step 230 can be skipped if there is a sufficiently thick channel of "non-bright/non-dark" pixels between the two regions (i.e., pixels having grey levels between the dark threshold and the bright threshold). The channel thickness threshold in the exemplary embodiment is clamped to between 3 and 6 pixels, and is otherwise expressed as 60% of the smaller of the two largest bounding box dimensions (width or height) of the two marks.

A pruning step 235 can be performed to remove from further consideration features that do not exceed a minimum size threshold. For example, surface aberrations of the pad may appear as freckles can be distinguished from actual probe mark features since the computed area of the surface aberration, or freckle, will be substantially less than a probe mark. Further examples of pruning features of marks is described in commonly owned U.S. patent application Ser. No. 10/032,168, entitled "Probe Mark Inspection Method and Apparatus," incorporated herein by reference.

The result of the inspection step 170 is a probe mark inspection result, such as a report of a detected probe mark characteristic, such as data in the form of a blob scene description of a detected probe mark, including topological and geometric features, that can be returned at step 240.

The application of image preprocessing to facilitate probe mark inspection of the present invention is not limited to Gabor band reject filters and regular textured pads. Alternate embodiments of the present invention can be applied to pads exhibiting any spatial pattern over the surface of the pad.

A pad exhibiting an image gradient in the image of the pad 150 can be preprocessed through the application of a high pass filter on the image. The low frequency gradient will be removed resulting in a zero-average-greylevel. To ensure the average intensity of the image remains unchanged with the application of a high pass filter, the average greylevel intensity can be computed before and after filtering the image. The difference between the average greylevel intensity before and after the filter can then be added to the intensity of each pixel in the filtered image to restore the average greylevel intensity of the filtered image.

An alternate embodiment of image pre-processing of present invention can be described generally as the removal of patterns of shapes that do not have a uniform greylevel intensity. A filter can be constructed, for example, using template comparison. Template comparison corresponds to the computation of a template of the expected pad appearance and considering any differences between the runtime image and the template to be a defect. Golden template comparison (GTC) is one of many variants of template comparison that are commonly known in the art. In GTC, a threshold image specifies how much a particular pixel element must deviate from the associated pixel element in the template before it is associated with a defect. Once any variant of template comparison is performed to produce a subtraction image, probe mark inspection can then be performed on the features of the probe mark. Further, image pre-processing can generally include the application of a combination of image processing filters, such as the median bias filter 228 in conjunction with other image processing filters before performing pad registration or inspection.

While the invention has been described with reference to the certain illustrated embodiments, the words which have been used herein are words of description, rather than words of limitation. Changes may be made, within the purview of the appended claims, without departing from the scope and sprit of the invention in its aspects. Although the invention has been described herein with reference to particular structures, acts, and materials, the invention is not to be limited to the particulars disclosed, but rather extends to all equivalent structures, acts, and materials, such as are within the scope of the appended claims.

We claim:

1. A method of analyzing a probe mark of an interconnection pad of an electronic device, the method comprising:
    acquiring an image of the interconnection pad of the electronic device, the interconnection pad having a probe mark having at least one dimensional characteristic, and the interconnection pad having at least one feature not associated with the probe mark; and
    filtering the image using an image processing filter wherein the at least one dimensional characteristic of the probe mark is preserved, and the at least one feature of the interconnection pad not associated with the probe mark is not preserved, to provide a filtered image of the probe mark, the image processing filter transforming the image into a frequency domain to provide a transformed image; filtering the transformed image with an oriented spatial band pass filter, and transforming the transformed image into a spatial domain.

2. The method of claim 1 further comprising:
    registering the interconnection pad in the filtered image of the probe mark.

3. The method of claim 1 further comprising a probe mark inspection of the filtered image.

4. The method of claim 1 wherein the oriented spatial band pass filter is a Gabor band reject filter.

5. The method of claim 1 wherein the feature of the interconnection pad not associated with the probe mark comprises a striped pattern.

6. The method of claim 1, wherein the oriented spatial band pass filter further comprises a low frequency threshold.

7. A method of analyzing an interconnection pad of an electronic device, the method comprising:
    acquiring an image of the interconnection pad of an electronic device, the interconnection pad having an oriented structured pattern;
    transforming the image into a frequency domain to provide a transformed image;
    selecting a frequency having a peak magnitude in the transformed image;
    providing a spatial band-reject filter, the spatial band-reject filter having a frequency parameter corresponding to the selected frequency;
    filtering the transformed image using the spatial band-reject filter to provide a filtered image; and
    transforming the filtered image into a spatial domain.

8. The method of claim 7 wherein the step of selecting a frequency further comprises:
    filtering the transformed image using the spatial band-reject filter using the frequency parameter corresponding to the frequency having a peak magnitude in the transformed image, to provide a first score;
    providing at least one comparison frequency;
    filtering the transformed image using the spatial band pass filter using the frequency parameter corresponding to the at least one comparison frequency to
    provide a second score; and
    selecting a frequency by comparing the first score and the second score to provide a selected frequency.

9. The method of claim 8, wherein the comparison frequency is computed from the frequency parameter corresponding to the frequency having a peak magnitude in the transformed image and a step size parameter.

10. The method of claim 7, wherein the spatial band-reject filter is a Gabor band reject filter.

11. The method of claim 8 further comprising convolving the transformed image with a spatial filter.

12. The method of claim 11 wherein the spatial filter is a 3×3 kernel.

13. The method of claim 8 wherein the first score and the second score further comprises:
    computing an edge magnitude image from the filtered image; computing a histogram of the edge magnitude image;
    and measuring the smoothness of the histogram of the edge magnitude image to provide a score.

14. An apparatus for inspecting a probe mark of an interconnection pad of an electronic device, the apparatus comprising:
    a camera configured to acquire image data corresponding to a semiconductor pad of an electronic device;
    a machine vision system coupled to the camera and configured to convert image data acquired by the camera into a digitally filtered representation of the pad by applying an image processing filter on the acquired image data, and performing a probe mark inspection on the digitally filtered representation of the pad, applying an image processing filter including, the image processing filter transforming the image into a frequency domain to provide a transformed image;
filtering the transformed image with an oriented spatial band pass filter, and transforming the transformed image into a spatial domain.

15. The apparatus of claim 14, wherein the machine vision system includes a processor that is configured to work in cooperation with a controller to control operation of the machine vision system, the controller cooperating with the processor to fetch instructions from memory and decode the instructions so that the machine vision system is configured to acquire image data corresponding to the pad, applying the image processing filter on the acquired image data, and perform the probe mark inspection.

16. The apparatus of claim 14, wherein the machine vision system registers the pad in the digitally filtered representation of the pad.

* * * * *